Aug. 30, 1966        D. MIRSKY        3,269,792
APPARATUS FOR PHOTOGRAPHICALLY PLOTTING AN OCULAR FIELD
Filed Dec. 5, 1961        2 Sheets-Sheet 1
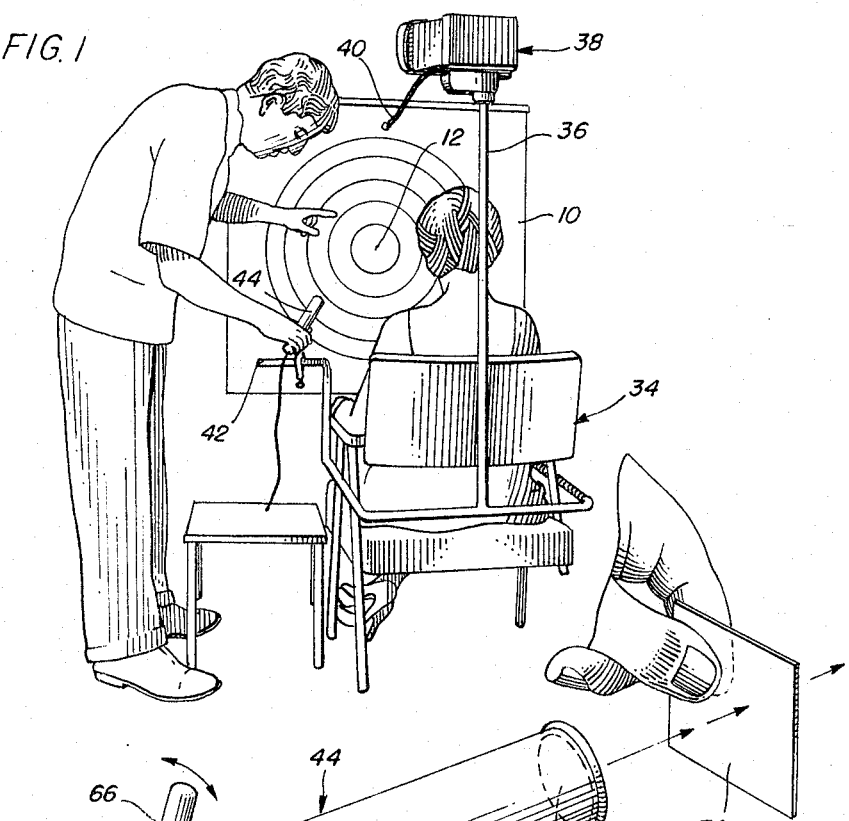
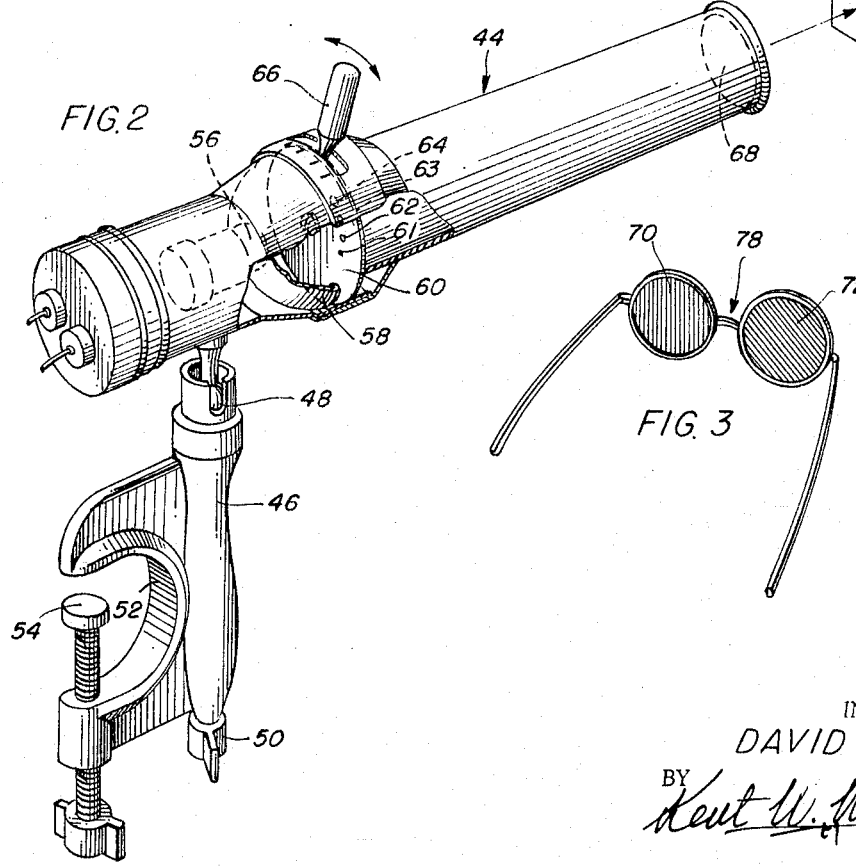
INVENTOR:
DAVID MIRSKY
BY Kent W. Wonnell
ATT'Y INVENTOR:
DAVID MIRSKY
BY
Kent W. Youmell
ATT'Y

United States Patent Office 3,269,792
Patented August 30, 1966

3,269,792
APPARATUS FOR PHOTOGRAPHICALLY
PLOTTING AN OCULAR FIELD
David Mirsky, 5924 Madison, Morton Grove, Ill.
Filed Dec. 5, 1961, Ser. No. 157,183
3 Claims. (Cl. 351—23)

This invention relates in general to an ocular photo field plotting unit for automatically plotting and recording certain fields for the purpose of studying progressive pathology extent of field loss.

An important object of the invention is to provide a new apparatus for plotting and comparing central visual fields for the purpose of providing a positive chart of conditions at any time for studying ocular and progressive pathology.

A further object of this invention is to provide a means for definitely locating and visually recording any blind areas in an ocular recording chart.

A further object of the invention is to eliminate the necessity for transposing of pin marker locations from a screen to specific recording charts and thus eliminating inherent error in such transmission of a previous method of plotting and recording.

Still a further object of the invention is to reliably locate blind areas in ocular plotting practices and thus to place confidence in such central field studies as made by relatively untrained personnel.

Still a further object of the invention is to utilize this system of recording actual ocular central field in a comparatively short time and in fact to complete an entire field in little more than the time needed for a screening technique.

Still a further object of the invention is to use a well known and easily obtainable camera for recording a patient's blind areas in a short time and immediately prior to a correction of strabismic conditions.

A further object of the invention is to provide a visual chart which is easily and quickly obtained from a well known type of camera immediately after the examination of the patient and upon the same chart for simply recording the condition of both eyes with relation to an actual central field in an office for making other ocular examinations.

Other objects of the invention will appear in the specification and will be apparent from the accompanying drawings in which, FIG. 1 is a perspective view illustrating in general the position and location as well as the approximate structure of the apparatus used in carrying out this invention;

FIG. 2 is a perspective view of a projector of FIG. 1, partly broken away for clearness;

FIG. 3 is a perspective view of red and green lens spectacles;

Figure 4:
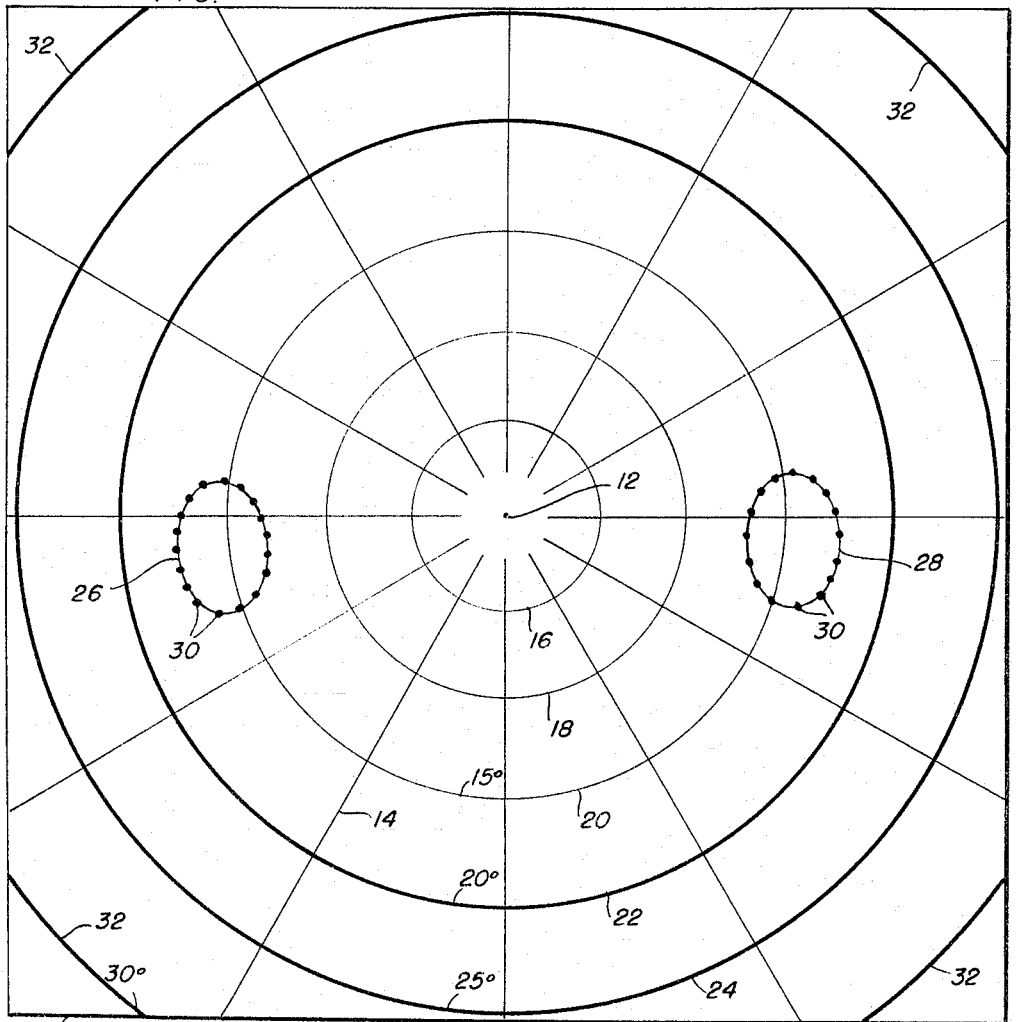
FIG. 4 is an enlarged plan view of the wall chart used illustrating the location of the black and red lines.
Figure 5:
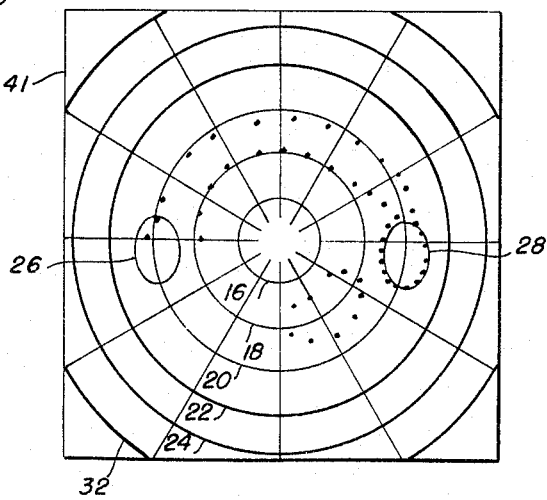
FIG. 5 is a plan view illustrating the appearance of negative as produced by this system.

This invention employs a projected white dot on a light reflective tangent screen having a polar coordinate pattern computed for a one meter distance. This system is unique in photographically recording various positions of the dot on the screen in a single recording chart for both eyes which may be exposed as many times as necessary to completely outline the blind spots, for example, or any existing field defects.

When plotting a field, a patient reports seeing the dot as it leaves the blind spot, and all that a doctor or technician needs to do is to open and close the camera shutter by using the cable release which is held in the hand. The blind spot as plotted shows up in the picture recording chart for its exact relationship as it appeared on the tangent screen.

Referring now more particularly to the drawings, nearly all of the apparatus for producing a chart for plotting central visual fields is illustrated in FIG. 1, in which a flat chart or screen 10 has a one centimeter dot 12 at the center with radiating lines 14 each extending 30° apart with a series of concentric circles 16, 18, 20, 22, 24 five degrees apart extending substantially to the 25° limit except at the corners. In addition, there is an outline 26 and 28 at the normal blind spot on each side of the center containing about sixteen dot 30 positions which are about equally spaced on an elliptical oval approximately located at the normally blind spots of the two eyes of a patient.

The lines on the screen are all printed in a light red color on a white background except for the complete 20° and 25° rings and corner sections 32 of a 30° ring which are printed in black, the color of the red being such that the red markings cannot be observed when the screen is viewed by the eye of a patient through a red filter.

The dot positions 30 serve to act as a guide to a doctor or any other examiner so that in actually plotting these ovals from invisible to visible positions of a dot, he can obtain a more perfect blind spot outline. These dot positions 26 and 28 also help to prevent overlap plottings and aid in making some accurate comparisons of repeated chartings for a luminous dot of the same patient. In carrying out the invention, a patient's chair 34 is located in front of the chart which is normally positioned in a vertical position with the eyes of a person or patient located at one meter from the approximate center of the chart. The vertical height of the chart may be varied by adjustment of a screen roller. When the position of the chair has been set to place the patient's eyes one meter from the charts, marks may be made on the floor so that the chair will not need to be repositioned for each patient. The zero position on the screen at the center thereof should be on a substantially direct line with the mid-line of the patient's head, and the patient should sit quietly leaning against the chair back.

A vertical support 36 is located at the back of the chair and extends upwardly above the head of a patient at the top of which is a Polaroid camera 38 (preferably Model 800) with the opening set manually for the exposure value 12 and a cable-release 40 is operatively connected to the camera. In this camera, film of a conventional self-developing type is used i.e. the standard outdoor film with the 10 second developing speed is preferable.

The camera is mounted on the support and has a wide angle lens in which the camera field of view will completely encompass the lateral limits of the chart 10. The vertical limits of the chart may be partially restricted so that the 25° circle 24 will be visible at the lower section of the chart, the upper visual field being normally restricted by the limits of a patient's frontal bone. Generally, a doctor will be aware of any special pathology in the superior field, and if he desires, he may then re-aim the camera so as to photograph the entire 25° circle of the superior field.

At the sides of the chair are opposite projections 42 either one of which is adapted to hold a lamp projector 44 which has a mounting 46 with a universal pivot 48 at the top control through the bottom thereof by a thumbscrew 50. At the other side of the mounting is a recess 52 for receiving a clamping screw 54 adapted to engage one of the arm projections 42 and to clamp the projector tightly thereto by means of the screw 54, but to permit the projector to be moved relatively to its mounting by means of the universal pivot 48 and its thumbscrew 50. By this means, the mounting may be firmly attached to one of the arm projections, the thumbscrew 50 may be adjusted so that the projection 42 may be turned in a horizontal plane, and also up and down if desired to note the lamp images upon the screen 10. This pivot 48 is preferably a ball and socket joint and is thus capable of a relatively free movement in all directions as limited by its thumbscrew 50.

The projector proper comprises a bulb 56 mounted in a parabolic reflector 58 and a target or spot-control slide 60 mounted directly in front of the reflector with aperture openings 61, 62, 63 and 64 for 1, 3, 5 and 10 millimeter openings, for example, in the target or spot-control slide and rotatably adjusted and controlled by a setting lever 66 extending to the outside of the projector. At the front of the projector is a projection lens 68 mounted forwardly of the target or spot-control slide, the aperture opening remaining constant for any position in which it is set, and the apertures located in a laterally offset relationship to the central axis of the lamp and to the parabolic reflector to provide a parallel light illumination of the selected image area which is projected on the screen.

In this installation, a normal room should be illuminated by a 60–80 watt ceiling fixture which is located approximately 8 feet from the floor.

Actual field charting technique

The patient's left eye is occluded (blinded) and the projector 44 is mounted on the chair bracket arm support 42 on the right side of the chair. The projector will naturally extend in the position substantially parallel with the suggested blind spot at the right side of the center of the screen. A doctor or attendant then determines the size target or spot of light he desires to use and adjusts his projector setting lever 66 so that a 1, 3, 5 or 10 millimeter target or spot of light is projected on the screen. The operator then proceeds to move the target or spot of light to a position of the normal blind spot illuminated by the projector will disappear if the patient is looking at the exact center of the screen, that is, the fixation point or center dot 12 usually about one centimeter in diameter as he is originally instructed to do.

The operator may then proceed to move his projected white target or spot of light out of the normal blind spot at the right of the chart, and the point at which the patient first reports that he sees the white target on the screen; the cable release 40 on the camera 38 which is located with the slow speed outdoor film is tripped without changing the film, and the spot of light is again moved into the blind area of the oval outline 28 and is brought out at the next position, this procedure being repeated until the entire series of blind spots are outlined in the sixteen suggested positions on the chart and duly recorded on the corresponding positions of the film.

After the blind spot has been thus charted and photographically recorded, the light projector 44 is removed from the right projector rest bracket, and is operated freely by hand at the right side of the chart exploring the field for any other scotomata or blind areas. If such blind areas are discovered, the operator is then apprised to record its position on the picture recording film in the same manner that the normal blind spot was outlined.

If no other blind areas or constrictions of the normal field of that eye is detected, the doctor then switches the occluder to the other eye and plots the field of this other eye on the same picture recording film. The same procedure is followed as before and as many as 25 or more exposures of the chart and the projected light thereon as made as necessary, in order to bring out the polar coordinate pattern of the screen as referred to the other oval outline 26.

This particular new technique is possible because a slow speed outdoor film is employed under a relatively dim room illumination, and it is the difference of intensity of the projected light target or spot of light and background of the screen which enables this procedure to automatically record the central visual field of both eyes by a series of exposures on a single film of the camera in this manner.

The purpose behind the particular design in using the red line screen printed on a white background with the 20–25 and 30° rings printed in black, is to enable the operator to plot a more accurate central field for those patients who may have a central macular leision in one eye, and thus do not have the ability accurately to view a fixation point.

This new technique employs the use of a red lens 70 and a green lens 72. The red glass is placed before the eye which has poor fixation. An operator also holds a red filter between his thumb and forefinger directly in front of the projector lens 68 thus changing the projection target or spot of light from white to red. The patient is now able to see only the one centimeter fixation target through the green filter, and cannot see the red projected light target through the eye over which the green filter has been placed. The patient can observe the red light target only through the eye over which the red filter has been placed.

The doctor proceeds to plot the patient's normal blind spot in the usual manner except for the fact that when he is ready to record the dot positions, he will momentarily remove the red color filter 74 which he is holding between his thumb and fore-finger in front of the projector lens 68. This is done because the red colored light target appearing on the screen cannot be recorded on the Polaroid picture film. After plotting the normal blind spot, the operator then employs the same technique to plot the central blind area.

The purpose of the black rings 32 on the screen 10 is so that these rings are the only lines which commonly can be seen with both eyes, while the patient is wearing spectacles 78. Thus if the patient has a phoria, he is able to fuse or focus the black rings and thus to prevent the eye from turning out of position as would be the case if there were no fusional target for the patient to observe. The film as thus produced in the camera for one or both eyes of a patient may then be removed, particularly in the case of the Polaroid picture as set forth. The film or picture forms a diagram which, of course, all of the light spots in position thereon in emerging from the blind spots; and this film record may be directly labeled as belonging to the particular patient at the time that the indicated record is obtained. The attendant or doctor may also indicate in writing on the back of the card containing the film picture, that there is some other condition which requires attention. Thus the entire ocular central field may be observed, recorded and additional entries may be made thereon of other areas than simply the blind spots. With a plotted field of this kind, a physician or optometrist has accurately before him and may be able to prescribe and produce the proper remedy and equipment for the patient's physical condition and for a further treatment of the eyes.

While I have thus described a preferred apparatus for carrying it into effect in some detail, it should be regarded as an illustration or example rather than as a limitation or restriction of the invention, since various changes in the construction, combination, and arrangement of the parts may be made without departing from the spirit and scope of the invention.

I claim:
1. A system for charting the visual field and producing a permanent record, comprising in combination:
   a screen having indicia comprising polar coordinates including two normal blind spots, a central fixation spot and a plurality of concentric circles about said central fixation spot, at least an outermost circle being of a color different from that of an inner circle so that the inner circle can be made imperceptible to a patient viewing the polar coordinates to facilitate patient-focusing on the polar coordinates, said indicia being scaled for observation by the patient positoned at a predetermined distance;

a patient-positioning means spaced from said screen for orienting the patient's eyes at the distance from said screen for which said indicia is scaled;

light-projector means for directing a spot of light onto said screen, said light projector means including means movably mounting said projector means so that a spot of light may be swept over the area of the screen whereby the limit of the patient's visual perception is acertained;

camera means having a lens focused on said screen; and exposure-operating means for operating the camera means when a limit of a patient's visual perception is ascertained by a spot of light projected onto the screen for recording on a single film-frame, one-by-one, as the spots are projected onto said screen so that the recorded spots provide a record of the patient's visual field.

2. The system as claimed in claim 1 in which said light-projector means includes means for selectively adjusting the size of the spot of light projected onto said screen.

3. The system as claimed in claim 1 in which said camera is of the type using self-developing, self-printing film.

References Cited by the Examiner
UNITED STATES PATENTS

| | | |
|---|---|---|
| 1,601,394 | 9/1926 | Hunsicker. |
| 1,780,291 | 11/1930 | Cameron _____ 88—20 |
| 2,567,003 | 9/1951 | Wottring _____ 88—20 |

OTHER REFERENCES

Patrick: A Projection Scotometer, The Optician, June 4, 1948, pages 489–490.

JEWELL H. PEDERSEN, *Primary Examiner.*

T. L. HUDSON, *Assistant Examiner.*